Aug. 27, 1957  W. T. HARRIS  2,804,603
SOUND METER
Filed July 24, 1951

INVENTOR
WILBUR T. HARRIS
BY
Mitchell & Bechert
ATTORNEYS

United States Patent Office 2,804,603
Patented Aug. 27, 1957

2,804,603

SOUND METER

Wilbur T. Harris, Southbury, Conn., assignor to The Harris Transducer Corporation, Woodbury, Conn., a corporation of Connecticut Application July 24, 1951, Serial No. 238,330

17 Claims. (Cl. 340—11)

My invention relates to improved transducer means and in particular to transducer means for sound-metering applications, that is, to measuring equipment electrically responsive to low-frequency pressure variations. The present invention is in the nature of an improvement over my copending applications Serial No. 219,194, filed April 4, 1951, and Serial No. 238,329, filed on even date herewith, the latter of which has matured into Patent 2,725,-548.

It is an object of the invention to provide an improved device of the character indicated.

It is another object to provide a low-frequency transducer having an extended broad band of relatively uniform low-frequency response.

Another object is to provide an improved sound-metering transducer incorporating improved ambient-pressure compensation.

It is also an object to provide an improved sound-metering device with relatively simple means for quickly selecting an optimum response to transient pressure variations, whether of small or large magnitude.

Other objects and various further features of the invention will be pointed out or will occur to those skilled in the art from a reading of the following specification in conjunction with the accompanying drawings. In said drawings, which show, for illustrative purposes only, preferred forms of the invention:

Briefly stated, my invention contemplates improved means for detection of pressure variations, including low-frequency variations, with substantially uniform high sensitivity, throughout a broad band of response. Such detection may be achieved by treating the transducer means as variable reactance means and by utilizing low-frequency reactance fluctuations to modulate a high-frequency carrier. The improved device may be rendered relatively insensitive to changes in ambient pressure by novel mounting and by appropriate use of sound-attenuating means. In one form, two matched transducers are mounted in spaced relation on a common axis in such a way that one transducer is out of the principal response field of the other transducer or is so positioned as to uniformly affect such response field symmetrically about said axis; one of the transducers may be effectively encased in sound-attenuating material and flooded with the sound transmitting medium for subjection to ambient pressures. In another form, a single hollow transducer is employed with sound-attenuating means lining one radial side only of the transducer. Means are described for readily adjusting the detection circuit associated with the transducer, for optimum response in the presence of strong or in the presence of weak signals, whereby the linearity of the device may be maintained for substantially the full measuring range.

Figure 1:
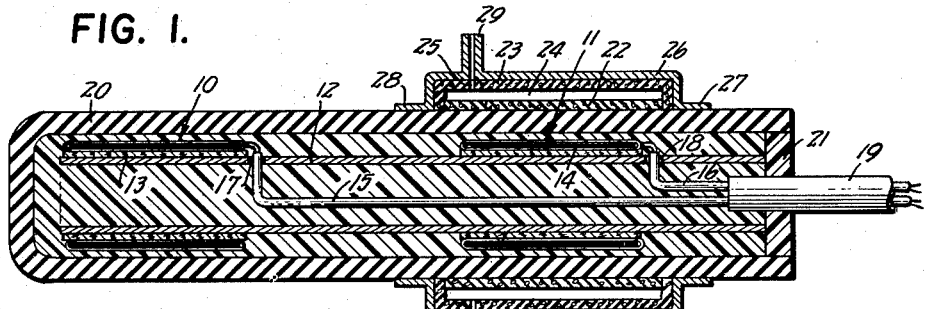
Fig. 1 is a longitudinal sectional view of a transducer assembly incorporating features of the invention.

Referring to Fig. 1 of the drawing, my invention is shown in application to transducer means particularly suited for sound metering or measuring purposes, as in measuring the level of underwater sounds. The device may include two substantially matched transducers 10—11 of hollow cylindrical configuration mounted on a common axis and in axially spaced relation. A rigid hollow tubular support 12 may provide the core of the assembly, and in the form shown each of the transducers 10—11 is held in radially spaced relation with respect to the core 12 by a layer 13—4 of sound-attenuating material, such as cork or hardwood. Electric-lead cables 15—16 for the transducers 10—11 may be brought to the interior of the core 12 by way of small openings 17—18 and combined in a suitable single cable 19 extending centrally out one end of the assembly. The assembly may be encased in a boot 20 of rubber-like material that is acoustically transparent, and the interior may be flooded and sealed with a suitable potting compound that is similarly transparent to soud. After potting, the assembly may be plugged, as at 21.

In order that one of the transducers may respond to incident sound to the exclusion of the other, I provide a sound-attenuating blanket 22 externally of one only (11) of the transducers. The blanket 22 may be of air-filled rubber or the like and preferably is at least as axially extensive as is the transducer 11. In the form shown, I have provided a short axial extension of the blanket 22 beyond the end limits of the transducer 11.

In order further to reduce the response of transducer 11 to incident sound I provide another blanket 23, externally of the blanket 22. The blanket 23 may be spaced from the blanket 22 so that, between them, blankets 22—23 define a hollow annular space 24. In order that the transducer 11 may respond to ambient pressure, the space 24 should be freely flooded with the fluid in which the sound measurements are being made. Therefore, the annular blanket 22—23 is preferably provided with a plurality of relatively small openings 25 externally of the device.

Ruggedness of the assembly may be enhanced by employment of a hard shell or sleeve 26 which may include flanges 27—28 to be supported on the outside of the boot 20. Relatively extensive small tubular projections 29 on the shell 26 and aligned with the opening 25 may further reduce the response of transducer 11 to incident sound.

Figure 3:
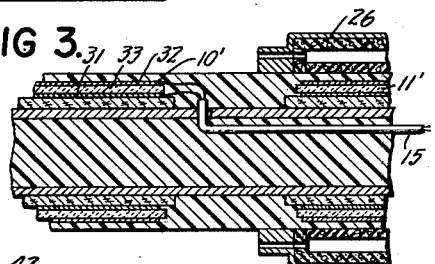

Each of the transducers 10—11 may be of generally conventional construction. In Fig. 1, the transducers 10—11 are of the toroidally-wound magnetostrictive type, so that each transducer may be considered a variable inductance, that is, an inductance varying in response to incident-pressure variations. In Fig. 3, the transducers 10'—11' are again cylindrical but perform as variable capacitors; these transducers may be of the type discussed in greater detail in my copending patent application Serial No. 238,329 and may thus comprise inner and outer cylindrical plates 31—32 on a ceramic cylindrical core 33.

Figure 2:
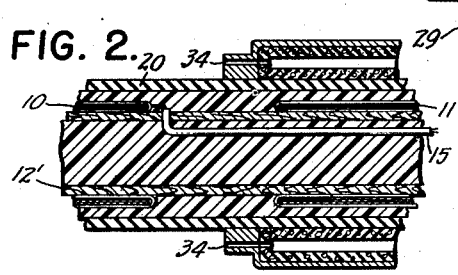
Figs. 2 and 3 are fragmentary views similar to Fig. 1 but showing two modified constructions.

In the form shown in Fig. 2, the construction has been slightly simplified by mounting the transducers 10—11 directly on a core 12' of hardwood or other suitably rigid pressure-relieving sound-attenuating material. Also, the free-flooding openings 34 are aligned transverse to the principal response plane of the transducer 10 so as to minimize response of transducer 11 to incident sound.

Figure 4:
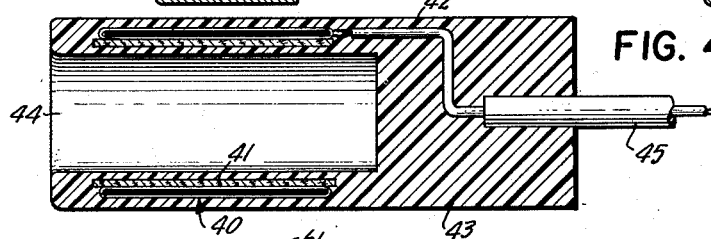
Fig. 4 is a longitudinal sectional view of a further transducer construction.

In applications in which ambient pressure does not present a serious problem, it may be desirable to dispense with the additional transducer 11 of Fig. 1, and in Fig. 4

I show the transducer for such applications. The transducer of Fig. 4 may comprise but a single hollow transducer element 40 with pressure-relieving or sound-attenuating means 41 lining one radial side thereof. The sound-attenuating means 41 may be a cylindrical layer of cork and lies inside the transducer element 40. The element assembly is completed by immersing all parts, including the transducer leads 42, in a sound-transparent potting material, as by casting in a suitable plastic 43. In the preferred form shown, the cast assembly is characterized by a freely flooded interior 44, open at one axial end and closed at the other. At the closed end, the leads 42 may be brought to a suspension cable 45 at a central location.

Figure 5:
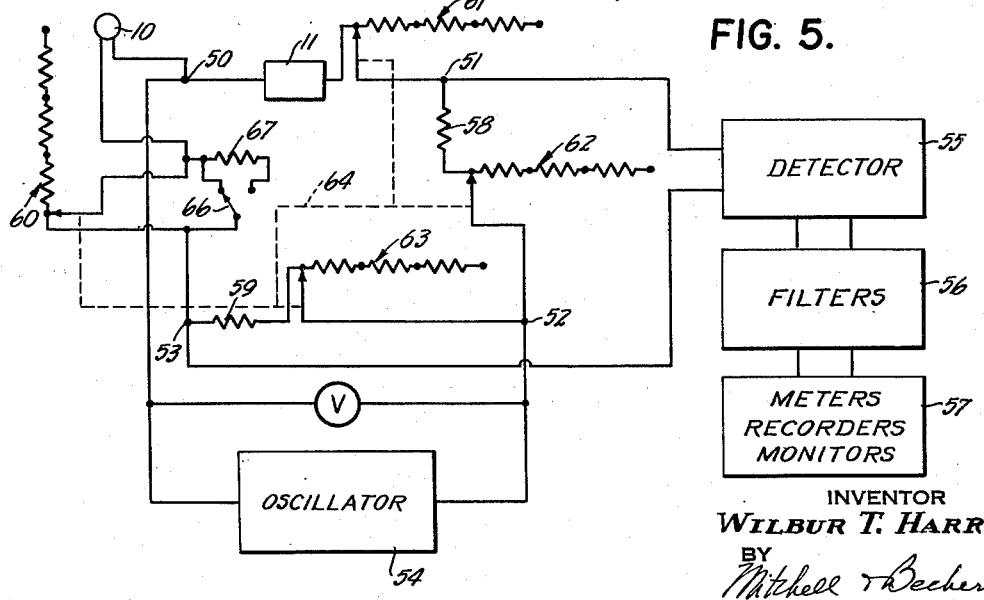
Fig. 5 is a circuit diagram which may employ a selected one of the transducers of Figs. 1 to 4.

As explained in my copending patent application Serial No. 219,194, broad-band response characterized by relative uniformity may be obtained by detecting reactance changes in the transducers as by introducing the transducers in an A.-C. bridge circuit. Fig. 5 shows such a circuit, which, for convenience, may be identified by the four corner terminals 50—51—52—53. A suitable high-frequency oscillator 43 may supply diagonally opposite corners 50—52 of the bridge with a carrier-frequency signal of a frequency sufficiently well above the maximum response frequency to be examined with the instrument. From the other diagonally opposite corners 51—53 bridge output may be fed to detector means 55 for rectifying the modulated high-frequency signal, to filter means 56 for isolating the desired frequency to the exclusion of unwanted side-band frequencies, and to meters, recorders, or monitors 57, as desired or needed. If a two-unit transducer assembly of the type shown in Fig. 1, 2, or 3 is to be employed, then the active transducer (10) may be inserted in one of two conjugate arms, as between the terminals 50—53, while the other or compensating transducer (11) is inserted in the other conjugate arm 50—51. If a single transducer of the type shown in Fig. 4 is employed, then appropriate ballasting means may be inserted in the arm 50—51 to provide the necessary bridge balance, as described in the said copending application Serial No. 219,194.

In accordance with a feature of the invention, the range of usefulness of the bridge of Fig. 5 may be extended so as to provide linearity of response to low-intensity signals as well as to high-intensity signals. Such means, in the form shown, comprises a plurality of variable impedances 60—61—62—63 inserted in series with the respective impedances 10—11—58—59 of the bridge. These variable impedances may all be matched to each other, but at least they are preferably matched in tandem in conjugate arms of the bridge. For ease of changeover, say, from intense sound-level measurements to weak sound-level measurements, the movable elements of the variable impedances 60—61—62—63 may be mechanically interconnected, as indicated schematically by the dotted lines 64. Thus, a single manual adjustment may effect the necessary changeover.

In a perfectly balanced bridge of the character described, it is often characteristic that detection, as 55, will produce a frequency-doubling effect. If frequency-doubling proves to be undesirable in any application, I provide additionally for the selectable insertion, by means of switch 66, of an unbalancing-impedance means 67 in one of the arms of the bridge. In the form shown, the impedance 67 may be selectably shunted across the impedance 60.

It will be seen that I have provided improved transducer means, particularly suited for sound-level measurements. With my arrangement, including processing circuitry, full correction for ambient pressure is assured in a unitary structure, all with a wide-band relatively uniform response. Also, linearity of response may be achieved for strong and weak incident pressure fluctuations, and frequency-doubling effects may be readily eliminated, if desired.

It will be noted that, when the transducer element is used in a bridge circuit (as described), and when such transducer element is small compared to a wavelength, the sensitivity of the system may be independent of frequency; further, when the impedance 11 in the conjugate bridge arm is a fixed impedance, as when employing the transducer of Fig. 4 in the circuit of Fig. 5, the device may serve to measure static pressure.

Even though my invention has been shown as being particularly useful in the metering of underwater acoustic energy, the principles are equally applicable to metering such energy in other media; for example, in sound-level metering in air, the present transducers may suffice, or it may be preferred to employ air-acoustics transducers of the type more fully disclosed in my copending application Serial No. 219,194.

While I have described my invention in detail for the preferred forms illustrated, it will be understood that various changes may be made within the scope of the invention as defined in the appended claims.

I claim:

1. Acoustic transducer means comprising two like transducers, means for supporting one of said transducers in proximity to the other and substantially out of the principal response field of said other, and means for shielding said one transducer against acoustic pressure to the exclusion of shielding said other transducer.

2. Acoustic transducer means, comprising two substantially matched toroidally wound magnetostrictive transducers, means for supporting one of said transducers in axially spaced relation with the other of said transducers, whereby said one may lie substantially out of the radial plane characterizing the principal response field of said other, and shielding means for said one transducer.

3. Acoustic transducer means, comprising two substantially matched variable capacitor transducers, each said transducer including a dielectric having a pressure-responsive dielectric constant, and shielding means for one of said transducers.

4. Acoustic transducer means, comprising two substantially matched cylindrical elements on a common axis, and shielding means for one of said elements.

5. Acoustic transducer means, comprising two substantially matched cylindrical transducers on a common axis, pressure-relieving means radially inwardly of both said transducers, and shielding means for one of said transducers.

6. Acoustic transducer means, comprising an elongated relatively rigid mount, two hollow cylindrical transducers supported in axially spaced relation on said mount, and shielding means for one of said transducers.

7. Transducer means according to claim 6, and including pressure-relieving means radially between said mount and each of said cylinders.

8. Transducer means according to claim 7, in which said mount is of wood, whereby said mount may serve for pressure-relieving purposes inwardly of both said transducers.

9. A sound-metering transducer comprising an elongated hollow cylindrical mounting member, two substantially matched hollow cylindrical transducers mounted over said mount and in axially spaced relation thereon, and acoustically transparent potting means in which said mount and said transducers are immersed.

10. A transducer according to claim 9, in which a boot of acoustically transparent rubber-like material encloses the potted assembly of said mount of said transducer.

11. Acoustic transducer means, comprising two substantially matched transducers, and shield means for one of said transducers, said shield means comprising a hollow annulus of sound-attenuating material, said annulus having a relatively small opening communicating between the hollow and the exterior thereof, whereby said annulus may be flooded so as to subject said one transducer essentially only to ambient pressure.

12. Transducer means according to claim 11, in which said sound-attenuating means is air-filled rubber-like material.

13. A sound-metering transducer assembly, comprising an elongated relatively rigid mounting means, two substantially matched cylindrical transducers surrounding axially spaced parts of said mounting means, acoustically transparent potting means in which said mounting means and said transducer are immersed, and an air-filled cylindrical blanket encasing said assembly for at least the longitudinal extent of one of said transducers.

14. Acoustic transducer means, comprising a hollow cylindrical transducer, an annulus of pressure-relieving material on one radial side of said transducer, and potting means in which said transducer and said pressure-relieving means are immersed, said potting means being shaped to provide a hollow interior space within said transducer, said space being closed at one end and open at the other end of said transducer.

15. Transducer means according to claim 14, in which electric leads for said transducer are also immersed in said potting means and are brought out of said potting means substantially at the center of the closed end.

16. Acoustic transducer means, comprising a hollow cylindrical transducer, an annulus of pressure relieving material within said transducer, and potting means in which said transducer and said pressure relieving means are immersed, said potting means being acoustically transparent.

17. Acoustic transducer means comprising a hollow cylindrical transducer, an annulus of pressure relieving material substantially axially coextensive with said transducer and on one radial side thereof, and potting means of acoustically transparent material continuously and intimately covering both transducer and said pressure relieving means.

References Cited in the file of this patent

UNITED STATES PATENTS

| | | |
|---|---|---|
| 1,101,830 | Berger | June 30, 1914 |
| 2,410,805 | Black | Nov. 12, 1946 |
| 2,434,900 | Black et al. | Jan. 27, 1948 |
| 2,476,954 | Blackburn | July 26, 1949 |
| 2,521,136 | Thuras | Sept. 5, 1950 |